US008244865B2

(12) United States Patent
Burke et al.

(10) Patent No.: US 8,244,865 B2
(45) Date of Patent: Aug. 14, 2012

(54) METHOD AND APPARATUS FOR AUTONOMIC MANAGEMENT OF CONNECTION POOLS

(75) Inventors: Michael Robert Burke, Rochester, MN (US); George Silber, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2158 days.

(21) Appl. No.: 10/961,740

(22) Filed: Oct. 8, 2004

(65) Prior Publication Data

US 2006/0095572 A1 May 4, 2006

(51) Int. Cl.
*G06F 15/16* (2006.01)
(52) U.S. Cl. ......... 709/226; 709/227; 709/201; 709/203
(58) Field of Classification Search .................. 709/226, 709/227, 201, 203
See application file for complete search history.

(56) References Cited

U.S. PATENT DOCUMENTS

| 2004/0006625 | A1* | 1/2004 | Saha et al. ..................... 709/227 |
| 2004/0088413 | A1* | 5/2004 | Bhogi et al. ................... 709/226 |
| 2007/0288924 | A1* | 12/2007 | Srivastava et al. ............ 718/100 |

OTHER PUBLICATIONS

Burke, et al, U.S. Appl. No. 10/767,043, "Method and Apparatus for Managing a Connection Pool Using Heuristic Information", filed Jan. 29, 2004.

* cited by examiner

*Primary Examiner* — Djenane Bayard
(74) *Attorney, Agent, or Firm* — Grant A. Johnson

(57) ABSTRACT

A method and apparatus for autonomic management of a connection pool. One embodiment comprises initializing a connection pool with a set of initial settings, wherein the set of initial settings include a collection interval and a collection duration; collecting autonomic configuration data for the collection duration, the autonomic configuration data including a maximum number of connections observed during the collection interval; determining an set of optimal settings using the autonomic configuration data; and modifying the connection pool according to the set of optimal settings.

18 Claims, 8 Drawing Sheets

METHOD AND APPARATUS FOR AUTONOMIC MANAGEMENT OF CONNECTION POOLS

The present invention generally relates to methods and systems for managing access to computing resources. More particularly, the present invention relates to a method and system for autonomic management of connection pools.

RELATED APPLICATIONS

This application is related to U.S. patent application Ser. No. 10/767,043, filed Jan. 29, 2004 and entitled "Method and Apparatus for Managing a Connection Pool using Heuristic Information," which is herein incorporated by reference in its entirety.

BACKGROUND

The development of the EDVAC computer system of 1948 is often cited as the beginning of the computer era. Since that time, computer systems have evolved into extremely complicated devices. Although today's computers are more sophisticated than EDVAC, the most basic requirements levied upon computer systems have not changed. Now, as in the past, a computer system's job is to access, manipulate, and store information. This fact is true regardless of the type or vintage of computer system.

Some of the most fundamental techniques that computer systems use to access, store and manipulate information are reading and writing information in a data source, such as a database. Today, most databases are stored on powerful computers called "servers." Other computers, called "clients," access the database by sending search requests to the server over a computer network. The server computer receives the request, performs the requested operation, and then returns the results to the client.

Although the client/server model has many advantages, one drawback is that before a client can access the database, it must first connect to that database's server. Unfortunately, managing these connections requires a significant amount of overhead. That is, the server must use a certain amount of its computing resources to create the connections, to maintain the connections, and then release connections when they are no longer required. Those skilled in the art will appreciate that the total database overhead can be particularly significant for World Wide Web ("Web") based applications because each client application will usually use one or more isolated connections to request the desired operations and because most Web clients connect and disconnect frequently. As a result, more effort is often spent connecting and disconnecting the clients than is spent processing their requests. The creation overhead can be particularly significant because it decreases the perceived speed of the Web based application.

One partial solution to this problem is to use a technique called connection pooling. In this technique, special programs called application servers create a large number of connections, in advance, so that future client requests do not need to incur the creation overhead. When the request is satisfied and the response is returned to the user, the application server returns the resource to the connection pool for reuse. In essence, this technique spreads the connection overhead across several user requests so that each user request incurs a fraction of the total creation and disconnection cost.

Although connection pooling reduces the overhead required to create and destroy connections, one problem is that the pool itself requires some overhead to maintain. Thus, if the load decreases over time, maintaining a large number of connections in connection pool uses unnecessary resources. The conventional solution is to allow idle connections to "time-out." Unfortunately, this technique does not work well for applications that do not have a static load, because, when the load again increases, the number of connections currently in the pool will not be sufficient. Connections then have to be created as required, and client applications incur this creation cost.

U.S. patent application Ser. No. 10/767,043, filed Jan. 29, 2004 and entitled "Method and Apparatus for Managing a Connection Pool using Heuristic Information," introduced an extension to the connection pooling architecture that used heuristic data to ensure that the connection pool contains the required number of connections for a given time period. This extension improved the performance for applications that use connection pooling architectures, such as Java Database Connectivity ("JDBC") and Java 2 Connector ("J2C") connections, by attempting to predict when increased connections will be necessary. This extension also allowed the pool to populate itself with new connections during periods of lower workload instead of consuming system resources after the workload has begun to increase. One limitation of this extension, however, is that it still required manual intervention by a system administrator to collect the heuristic data and to configure the heuristic override section in the heuristic configuration file. These tasks can take considerable time and require considerable expertise.

Without a way for computer systems to configure their own connection managers, the promise of network computing may never be fully achieved.

SUMMARY

The present invention provides a method, system, computer program product for autonomic management of datasource connection pools. One aspect of the present invention is a method and apparatus for autonomic management of a connection pool. One embodiment comprises initializing a connection pool with a set of initial settings, wherein the set of initial settings include a collection interval and a collection duration; collecting autonomic configuration data for the collection duration, the autonomic configuration data including a maximum number of connections observed during the collection interval; determining an set of optimal settings using the autonomic configuration data; and modifying the connection pool according to the set of optimal settings.

DETAILED DESCRIPTION

Figure 1:
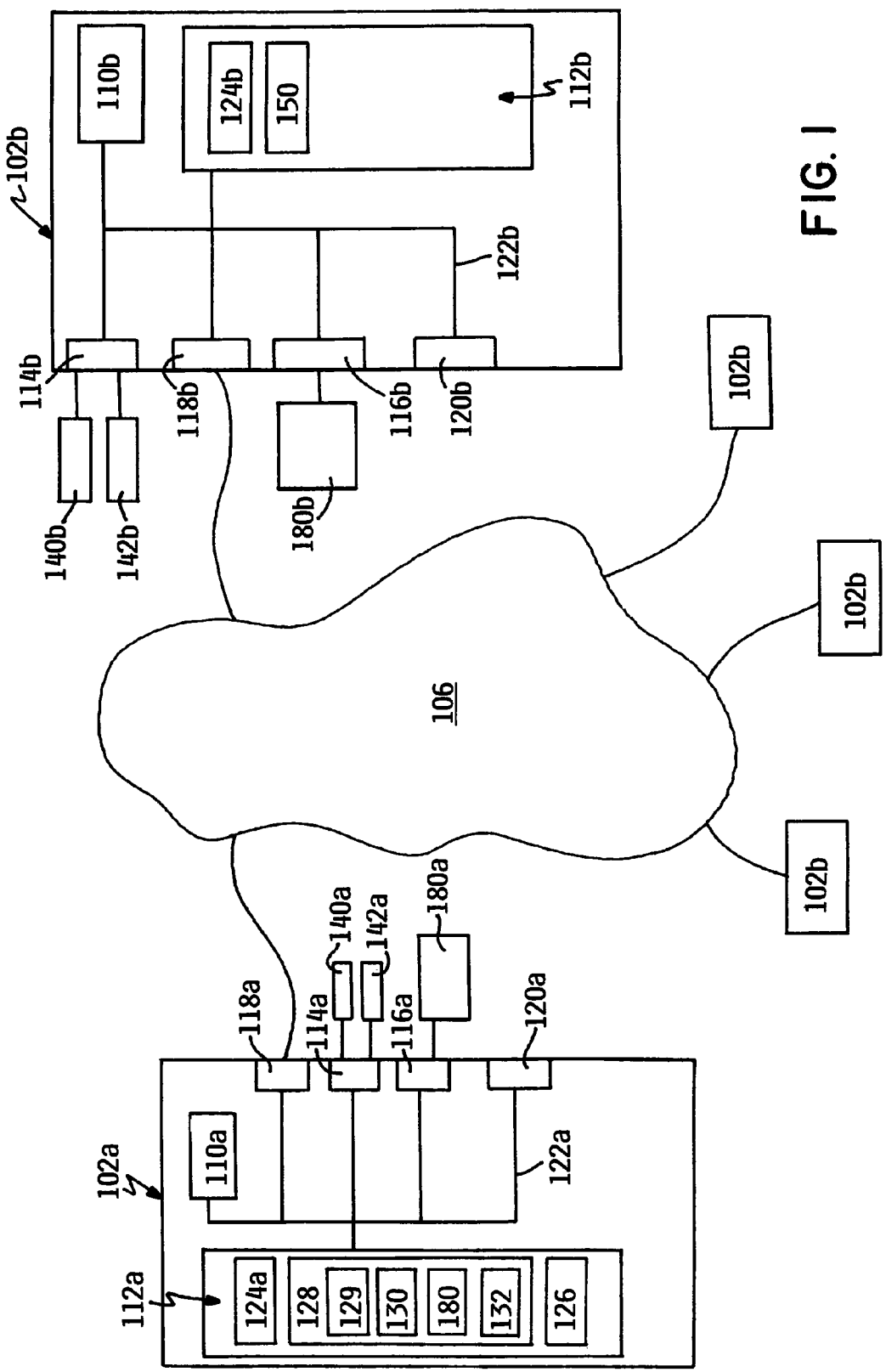
FIG. 1 illustrates one embodiment of an information technology system containing the present invention.

FIG. 1 depicts one embodiment of an information technology system 100 comprising a web server computer 102a and a plurality of client computers 102b (only one client computer 102b shown in detail for clarity) interconnected by a communications medium 106. Each computer system 102 has one or more central processing units 110 ("CPU") connected to a main memory unit 112, a mass storage interface 114, a display interface 116, a network interface 118, and an input/output ("I/O") interface 120 by a system bus 122. The mass storage interfaces 114 connect the system busses 122 to one or more mass storage devices, such as a direct access storage device 140 and a readable and a writable optical disk drive 142. The network interfaces 118 allow the computer systems 102 to communicate with each other and to a plurality of other computers (not shown) over the communications medium 106. The main memory 112a in the web server computer 102a contains an operating system 124a, a database 126 capable of receiving and servicing database requests, such as JDBC requests; an application server 128 capable of maintaining and managing a connection pool 129; a web application 132 capable of forming and receiving database requests and capable of receiving replies from the application server 128; a connection pool configuration file 130; and a connection pool manager 180. The main memory 112b in the client computers 102b contains an operating system 124b, and a web browser 150 capable of communicating with the web application 132.

In operation, the present invention provides for autonomic management of one or more connection pools 129. Autonomic computing generally refers to computing systems that have the ability to manage themselves and dynamically adapt to change in accordance with business policies and objectives. Self-managing environments can perform such activities based on situations they observe or sense in the information technology environment—rather than requiring information technology professionals to initiate the tasks. In this way, autonomic computing systems can improve the return on investment of information technology by reducing total cost of ownership, improving quality of service, accelerating time to value, and managing complexity.

In one embodiment, the connection pool configuration file 130 contains configuration information for the application server 128. The application server 128 uses the configuration information to adjust the number of connections in the pool to handle increased loads at specific times and/or specific days. In one example, the configuration file 130 for a typical e-commerce web site specifies a minimum number of connections ("MinConnections") that will be available in the pool, a maximum connection pool size ("MaxConnections") that can be contained in the pool, and a time-out period indicating how long an unused connection can remain in the pool before it is closed to reclaim resources. The configuration file 130 in this example contains the following configuration information:

00:00:00-08:00:00: MaxConnections=0;
    08:00:00-09:00:00: MaxConnections=10;
    09:00:00-11:00:00: MaxConnections=100;
    11:00:00-14:00:00: MaxConnections=150;
    14:00:00-18:00:00: MaxConnections=200;
    18:00:00-19:00:00: MaxConnections=100;
    19:00:00-20:00:00: MaxConnections=10;
    20:00:00-00:00:00: MaxConnections=0;

The example configuration data described above indicates there is no load expected on the connection pool 129 from 00:00:00 through 08:00:00. Between 08:00:00 and 14:00:00, the load is expected to gradually increase. Between 18:00:00 and 20:00:00, the load is expected to gradually decrease. As will be discussed in more detail with reference to FIGS. 2-4, when the application server 128 queries the pool size at 07:55:00, 08:55:00, 10:55:00, and 13:55:00, it will likely determine that the connection pool 129 requires additional connections and then will create those connections. When the application server 128 queries the pool size at 17:55:00, 18:55:00, and 19:55:00, it will determine that the connection pool 129 requires fewer connection and let the surplus expire. The determined number of new connections created by the application server 128 for a given time period is based on the following calculation:

$$\text{(number of new connections to be created)}=\text{(number of connections specified in the configuration file 130)}-\text{(number of current connections)}.$$

The connection manager 180 in this embodiment dynamically collects pool connection usage data for specified time intervals. The connection manager 180 uses this usage data to automatically and dynamically update the configuration file 130. That is, the connection manager 180 in this embodiment monitors and records the required connection load over specified time intervals and persists this information to override section in the configuration file 130. After a sufficient period of operation (e.g., day, week, month and/or year depending on the configuration), the connection manager 180 will change the configuration file 130 to reflect actual usage patterns. In this way, the connection manager 180 can collect new configuration data and apply the new data dynamically at run-time, rather than requiring a system administrator to manually monitor the required number of connection and manually modify the configuration file to reflect these heuristics.

In some embodiments, the system administrator can modify the configuration file 130 to instruct the connection pool manager 180 to stop gathering connection usage data and to use the configuration file 130 in a static manner. Also, in some embodiments, the system administrator can still manually edit the configuration file 130 to adjust for special periods when the connection usage is expected to differ from the collected data and/or instruct the connection manager 180 to use the configuration file 130 in a static manner. Thus, for example, if the daily or weekly connection usage pattern used throughout the year may not be adequate to meet the needs of the Christmas buying season between Thanksgiving and Christmas or for the day after a major sale begins, the system administrator can provide special configuration settings for those particular time periods.

Figure 2:
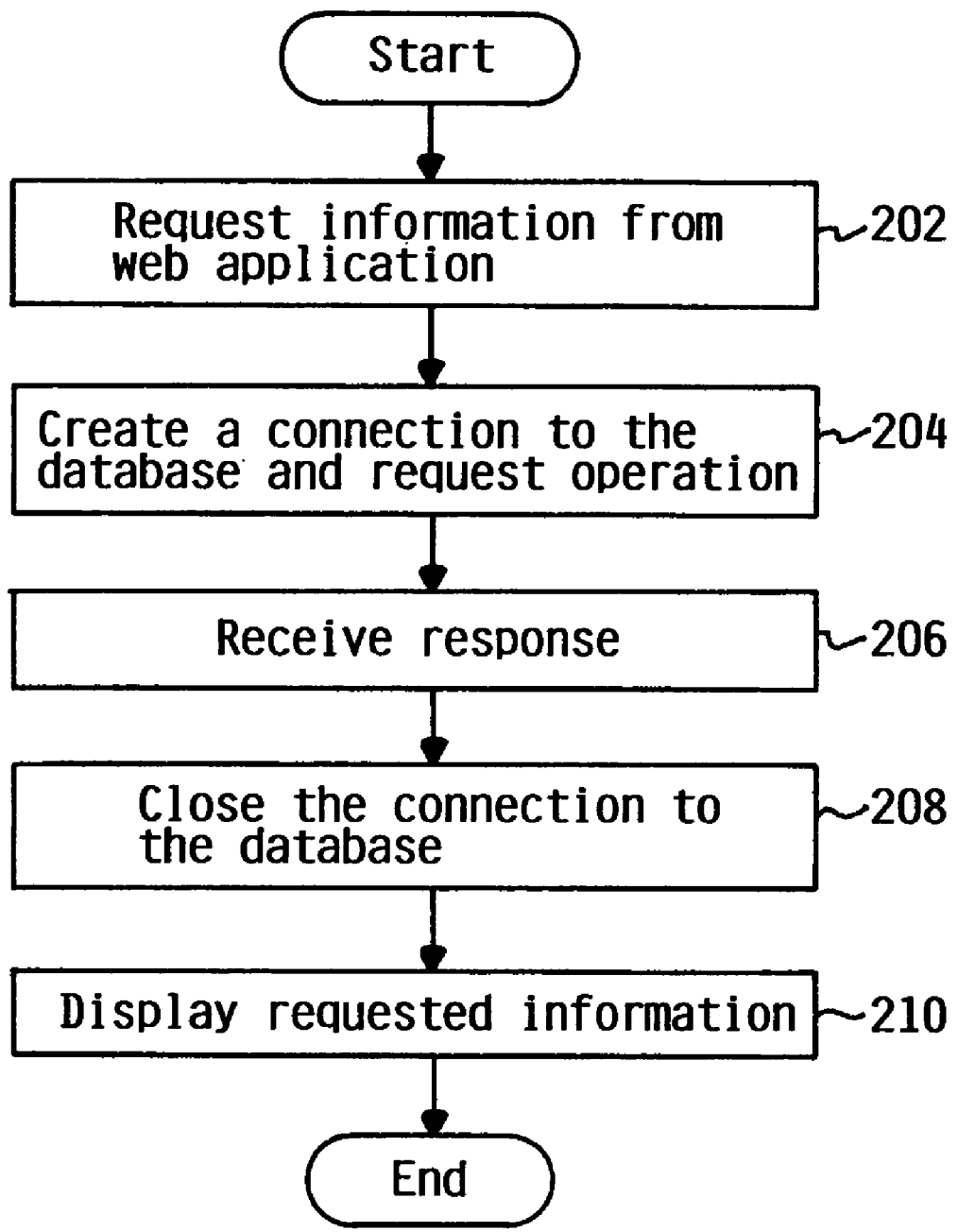
FIG. 2 illustrates the operation of the one web application embodiment.

FIG. 2 illustrates the operation of one web application 132 embodiment in more detail, specifically a Java Database Connectivity ("JDBC") implementation of a client/server database application. At block 202, a user of the client computer 102b requests some information from the web application 132. The request requires the browser 150 to send a message to the server computer 102a at block 204 requesting that it perform some operation on the database 126 (e.g. create a new record, read an existing record, update an existing record, delete an existing record, etc). The web application 132 in this example uses the network's naming service to lookup and obtain a reference to the connection pool 129, and then transmits this message using special communication protocols called JDBC Application Programming Interfaces ("APIs") to open a connection to the database. At block 206, the web application 132 waits for the server computer 102a to perform the requested operation and return the desired information. At block 208, the web application 132 uses the JDBC APIs to close the JDBC connection to the database 126. When the web application 132 closes a connection obtained from a connection pool, the connection to the database 126 is not closed, but rather is returned to a pool of free connections. These free connections are then available to any web application 132 that requests a connection from the connection pool 129. Finally, at block 210, the web application 132 displays the requested information to its user.

Figure 3A:
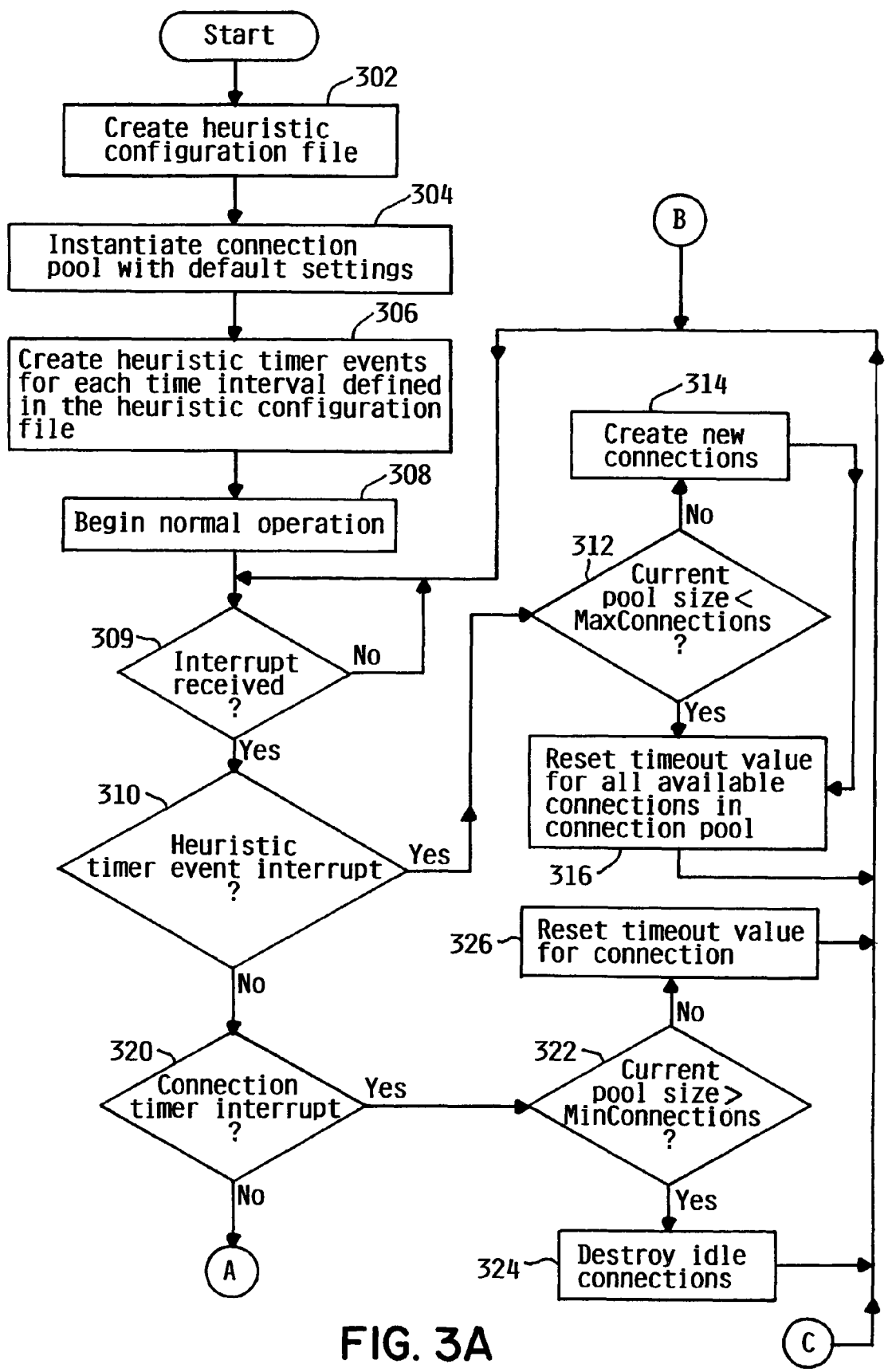
FIGS. 3A-3B illustrate the operation of one application server embodiment.
Figure 3B:
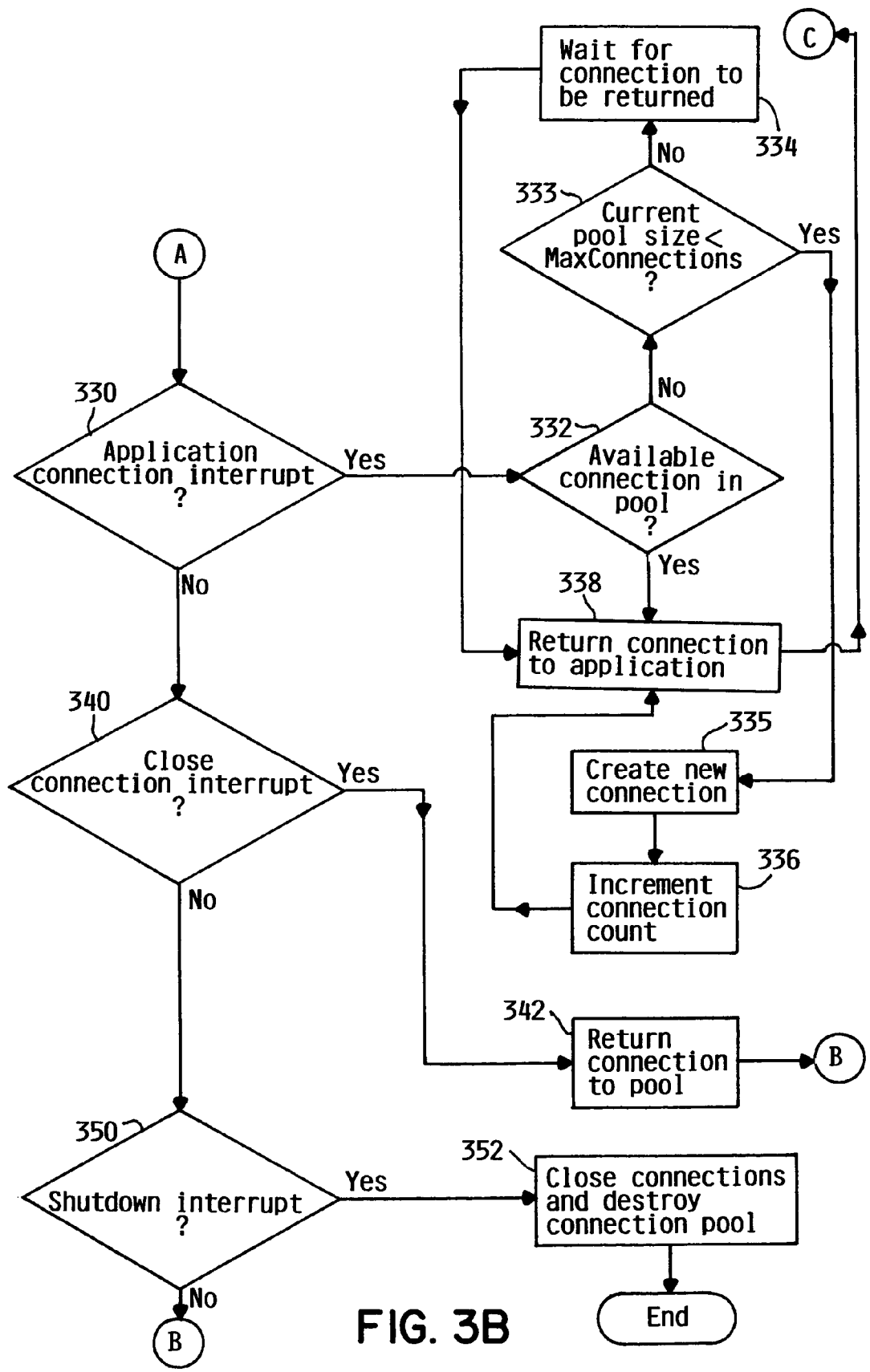

FIGS. 3A-3B illustrate the operation of one application server 128 embodiment in more detail, specifically a JDBC implementation of a client/server database application with connection pooling. At block 302, the server computer's system administrator creates the connection pool configuration file 130, which specifies the initial number of connections contained in the pool, the minimum number of connections that will be available at all times, the maximum number of connections that can be contained in the pool, and the time-out length (i.e. how long a connection can remain in the pool unused before being automatically closed by the connection manager). At block 304, the server administrator instructs the application server 128 to establish a pool of database connections using the ConnectionPoolDataSource API, as provided by the JDBC specification, and a set of default settings. The sever administrator then instructs the application server 128 to create a number of timer events indicating the end of each time interval defined in the configuration file 130 at block 306 and to begin normal operation at block 308. Once the application server 128 is instructed to begin normal operation, it will listen at block 309 for indication of an event, commonly called an interrupt. The application server 128 will perform certain actions after receiving an interrupt, then return to block 309 to wait for the next interrupt. Blocks 310-352 represent some of the interrupts to which the application server's connection pool manager will respond, together with the actions associated with that interrupt.

At blocks 310-312, if the application server 128 determines the interrupt received at block 309 is associated with a timer event, the application server 128 first compares the number of connections currently in the connection pool 129 to the MaxConnections value in the configuration file 130 associated with the current time-of-day. If the current number of connections is less than the MaxConnections associated with the current time-of-day, the application server 128 adds new connections to the pool at block 314. The application server 128 then initializes the timeout values for all available connections in the connection pool at block 316. This block ensures that none of the connections will expire until for a full time-out value after the timer event detected at block 310. The application server 128 then returns block 309 and waits for the next interrupt.

At blocks 320-322, if the interrupt received at block 309 is associated with the connection timer, the application server 128 first determines if the number of connections is at or below the minimum connection pool size. If the number of connections is above the minimum pool size, the application server 128 destroys the timed-out idle connections at block 324. That is, the connection timer interrupt is used to destroy a connection that is currently in the pool and no longer required. This closes the physical connection to the database, which frees system resources and shrinks the connection pool size by a single connection. If the number of connections is at or below the minimum number of connections, the application server 128 resets the timer for that connection at block 326.

At blocks 330-332, if the interrupt received at block 309 is an application connection request, the application server 128 first determines if the connection pool has an 'available' connection. If a connection is not available (i.e., all connections currently in the pool are being used to service other requests), the application server 128 determines at block 333 whether the number of connection currently in the pool 129 is less that the maximum number of connections specified in the configuration file 130. If the number of connections used is less than the maximum number allowed, the application server 128 creates a connection at block 335 and increments the count of the connections in the connection pool at block 336; otherwise the application server 128 waits for a connection to be returned to the connection pool at block 334. At block 338, the application server 128 uses the existing connection or the newly created connection to honor the connection request, marks the used connection as 'unavailable' to indicates that it cannot be used to honor future connection requests, and resets that connection's "time-out" value.

At blocks 340-342, if the interrupt received at block 309 is associated with a close connection request, the application server 128 returns the connection to the connection pool by marking it as 'available.'

At blocks 350-352, if the interrupt received at block 309 is associated with a shutdown request, the application server 128 closes all connections to the database and destroys the connection pool.

Figure 4:
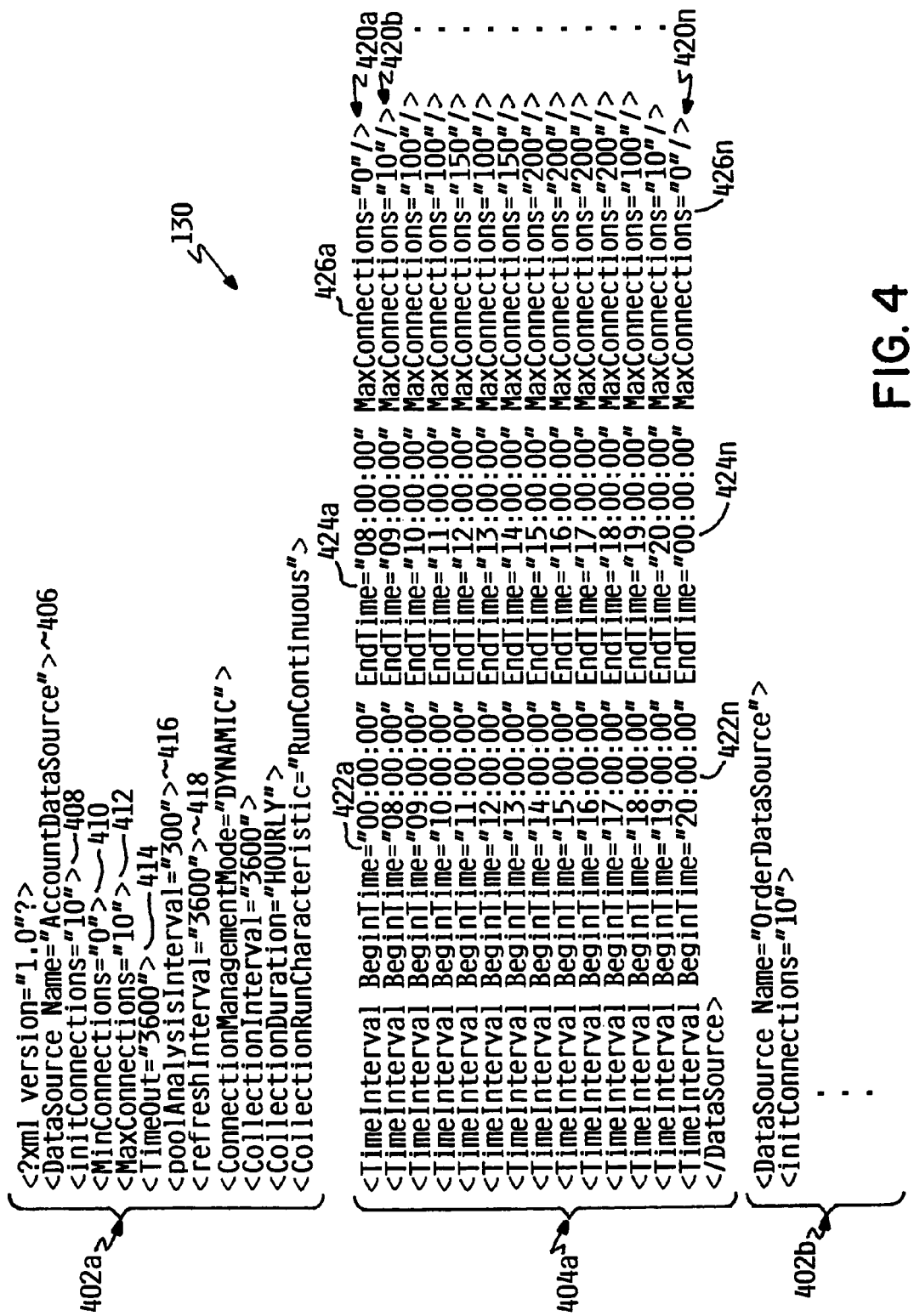
FIG. 4 illustrates one embodiment of the pool configuration file.

FIG. 4 illustrates one embodiment of the configuration file 130 in more detail. The configuration file embodiment 130 in FIG. 4 comprises an extensible Markup Language ("XML") document having a default settings section 402 and an override section 404. The default setting section(s) 402 comprise the name of the associated database ("datasource") 406; an initial number of connections to be created in the pool ("initConnections") 408; a minimum number of connections that will be available at all times ("MinConnections") 410; a maximum number of connections that can be contained in the pool ("MaxConnections") 412; and a time-out value indicating how long an unused connection can remain in the pool before it is closed to reclaim resources ("time-out") 414. The default settings sections 402 may also contain a pool analysis interval ("poolAnalysisInterval") 416 that specifies when the application server 128 is to analyze the pool size to determine if new connections need to be created (e.g., if this property 416 is set to '300,' the connection pool would analyze the pool size five minutes prior to each interval defined in the configuration file 130) and a "refreshInterval" value 418 that indicates the how often the application server 128 is to read in the configuration file 130 to refresh the usage data. The refresh interval 418 setting is desirable because it allows the system administrator to modify the configuration file 130 to reflect new usage patterns.

In some embodiments, the default settings sections 402 further contain a connection management mode ("connectionManagementMode") 430, a connection data collection interval field ("collectionInterval") 432, a collection duration field ("collectionDuration") 434, and a collection run characteristic ("collectionRunCharacteristic") 436. The connection management mode field 430 in this embodiment can contain one of the following three connection management options:

"off," signifying that the connection manager 180 will use conventional pooling management techniques (i.e., no heuristic or autonomic techniques);

"static," signifying that the connection manager 180 will use the heuristic configuration techniques described in U.S. patent application Ser. No. 10/767,043, filed Jan. 29, 2004 and entitled "Method and Apparatus for Managing a Connection Pool using Heuristic Information."

"dynamic," signifying that the connection manager 180 will use the autonomic management techniques of the present invention.

The collection interval field 432 indicates the time interval used to analyze the number of connections that exist in the connection pool that have actually been used by applications running on the application server 128. For example, if this property 432 is set to '3600,' the connection manager 180 would analyze the number of used connections that currently exist in the connection pool every sixty minutes. Thus, when the connection manager is in "dynamic" mode, the collection interval field 432 determines both the duration and quantity of the BeginTime/EndTime element in the configuration file 130.

The collectionDuration filed 434 in this embodiment contains a single value that can be selected from an enumerated list: "Day," "Week," "Month" or "Year." This value indicates how long the connection the autonomic connection usage information is to be gathered and the way in which it is to be recorded in the configuration file 130. The collection run characteristic field 436 ("collectionRunCharacteristic") in this embodiment contains a single value that can be selected from an enumerated list: "runOnce" or "runContinuously." This value tells the connection manager 180 whether it should collect the autonomic connection data through one cycle as defined by the collection duration field 434 and then stop, or whether it should continue to collect autonomic connection usage data and update the configuration file 130 continuously as long as the application server 128 remains running. This "runOnce" feature may be particularly desirable because it allows the connection manager 180 gather connection usage data and to construct the configuration file 130 after completing one cycle through the defined time period 434 and then operate in a static manner. This, in turn, may increase the performance of the application server 128 by removing the overhead associated with data collection, particularly when usage does not fluctuate significantly from time period 434 to the next.

The override section 404 comprises a plurality of overrides 420a-420n. Each override 420 comprises a "BeginTime" section 422a-422n, an "EndTime" section 424a-424n, and an override value 426a-426n. The BeginTime and EndTime sections 422, 424 specify a time during which the application server should use the associated override value 426. The system administrator can use these overrides to reflect the expected usage data. Some embodiments may also specify a "WeekDay" section (not shown for clarity) that will allow the system administrator to adjust based on day of week (e.g., the expected load will be high during business days, but low at night and on weekends) and a "holidays" section (not shown for clarity) that will allow the system administrator to adjust specific days (e.g., the expected load will be high the day after Thanksgiving). The application server 128 can apply these settings by dynamically creating additional connections prior to these peaks using the process described with reference to FIG. 3. One advantage of the embodiment in FIG. 4 is that the connection pools have a one-to-one association with the database 126 and the configuration file 130, which allows the server's administrator can individually configure the connection pool of the present invention for each database 126 running on the server.

In operation, the connection pool manager 180 analyzes the current connection load based on the collectionInterval property 432 and updates the override section 404 of the configuration data file 130 for the relevant time period. The refreshInterval property allows the connection manager 180 to refresh its run-time connection data 130 at the specified interval, which in turn causes the connection pool to dynamically reflect the newly collected connection load data. The autonomic configuration features of the present invention are desirable because they allow the connection manager 180 to adjust the connection pool over time, rather than requiring a system administrator to manually monitor the connection usage and manually update the data file 130.

Figure 5:
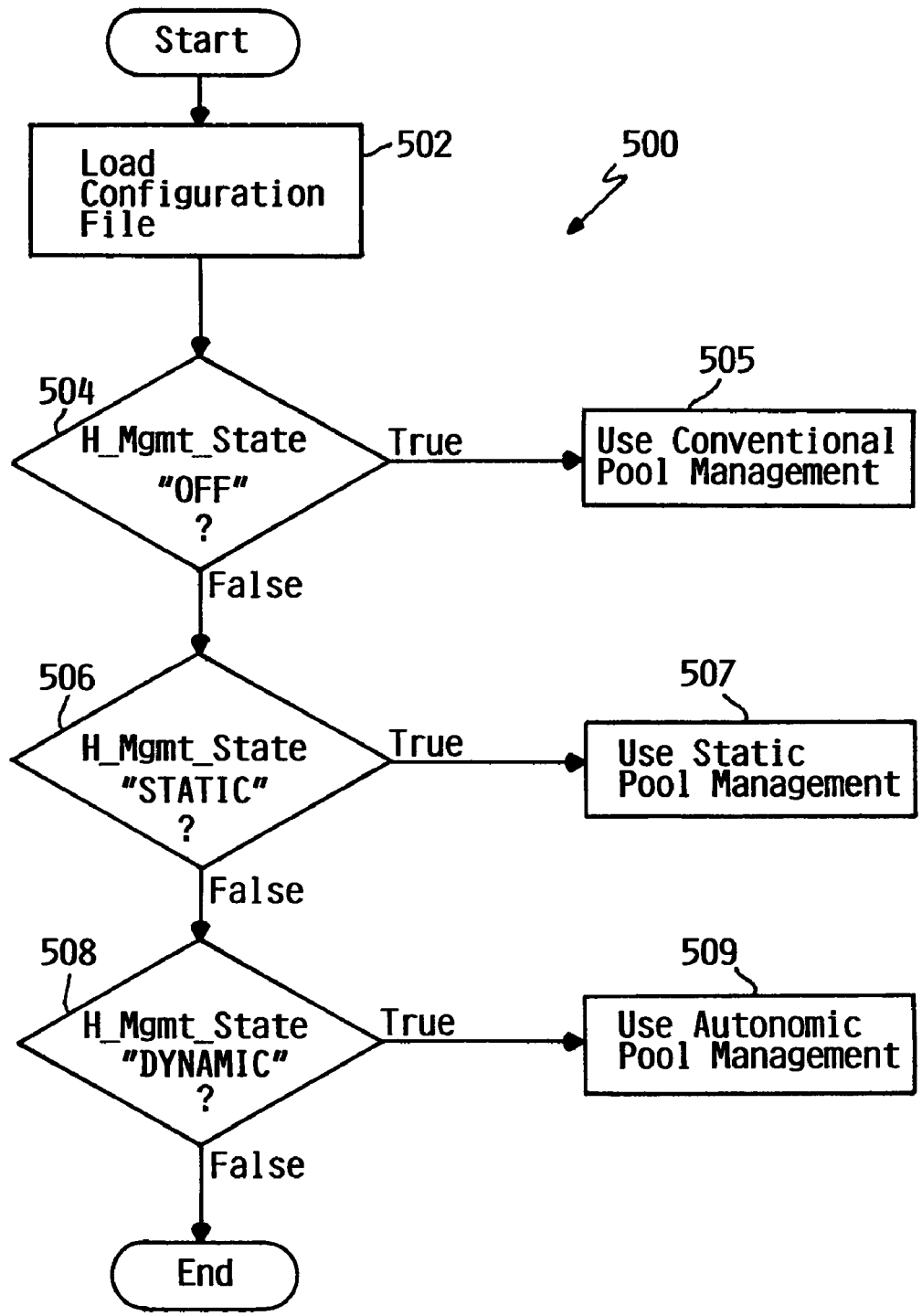
FIG. 5 illustrates one method of initializing a connection pool.

FIG. 5 illustrates one method 500 of initializing a connection pool. At block 502, the configuration manager 180 loads the current configuration file 130 and then parses the configuration file 130 to find the default settings section 402 associated with the first datasource 406. At block 504, the configuration manager 180 then checks whether the management mode field is "off." If true, the configuration manager initializes the connection pool using conventional pooling management techniques at block 505; if false, the configuration manager 180 then checks at block 506 whether the management mode field 430 is "static." If true, the configuration manager (at block 507) uses the connection management techniques described in more detail with reference to FIG. 3; if false, the configuration manager uses (at blocks 508-509) the autonomic connection management techniques described with reference to FIG. 6.

Figure 6A:
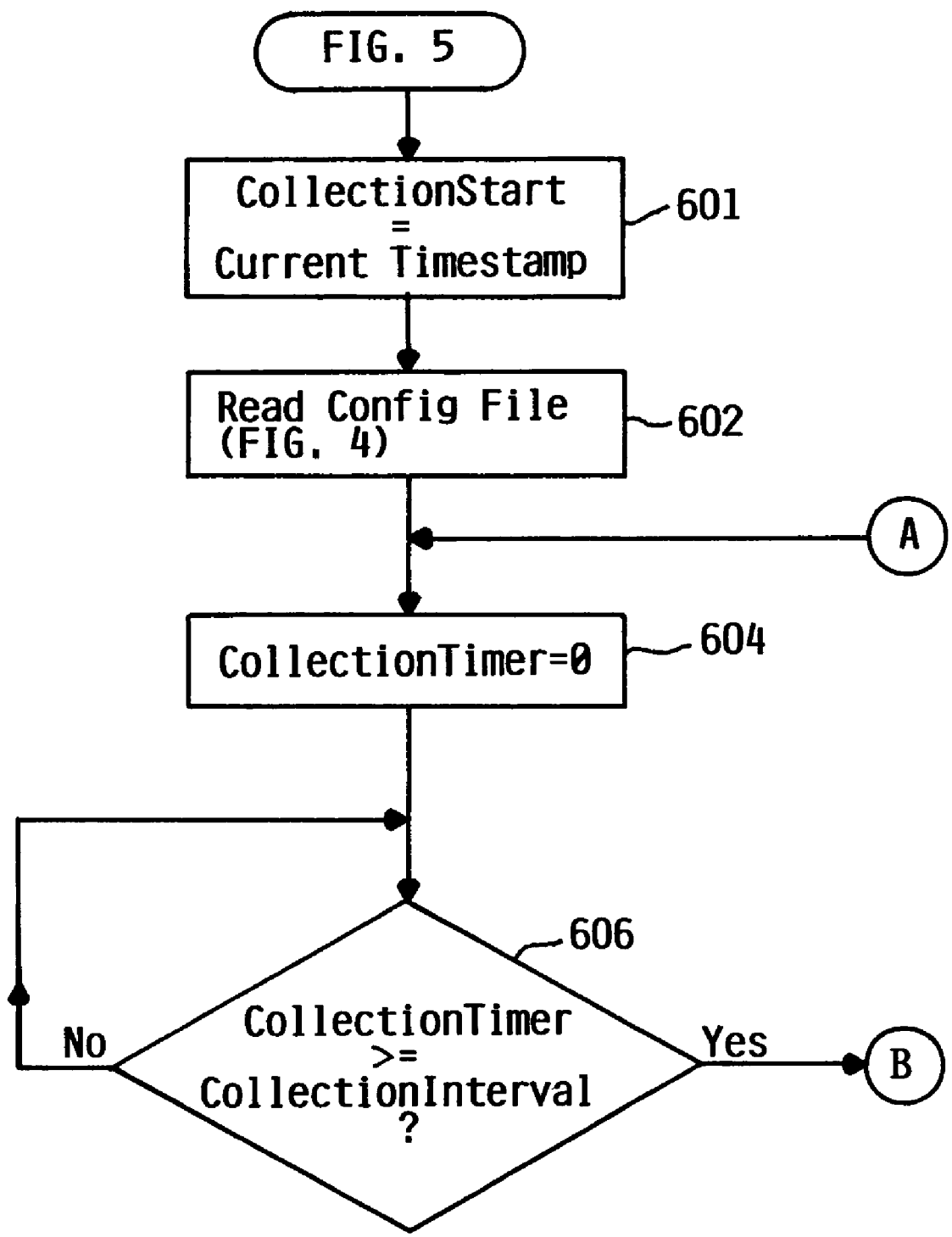
FIG. 6 illustrates one method of collecting autonomic configuration data.
Figure 6B:
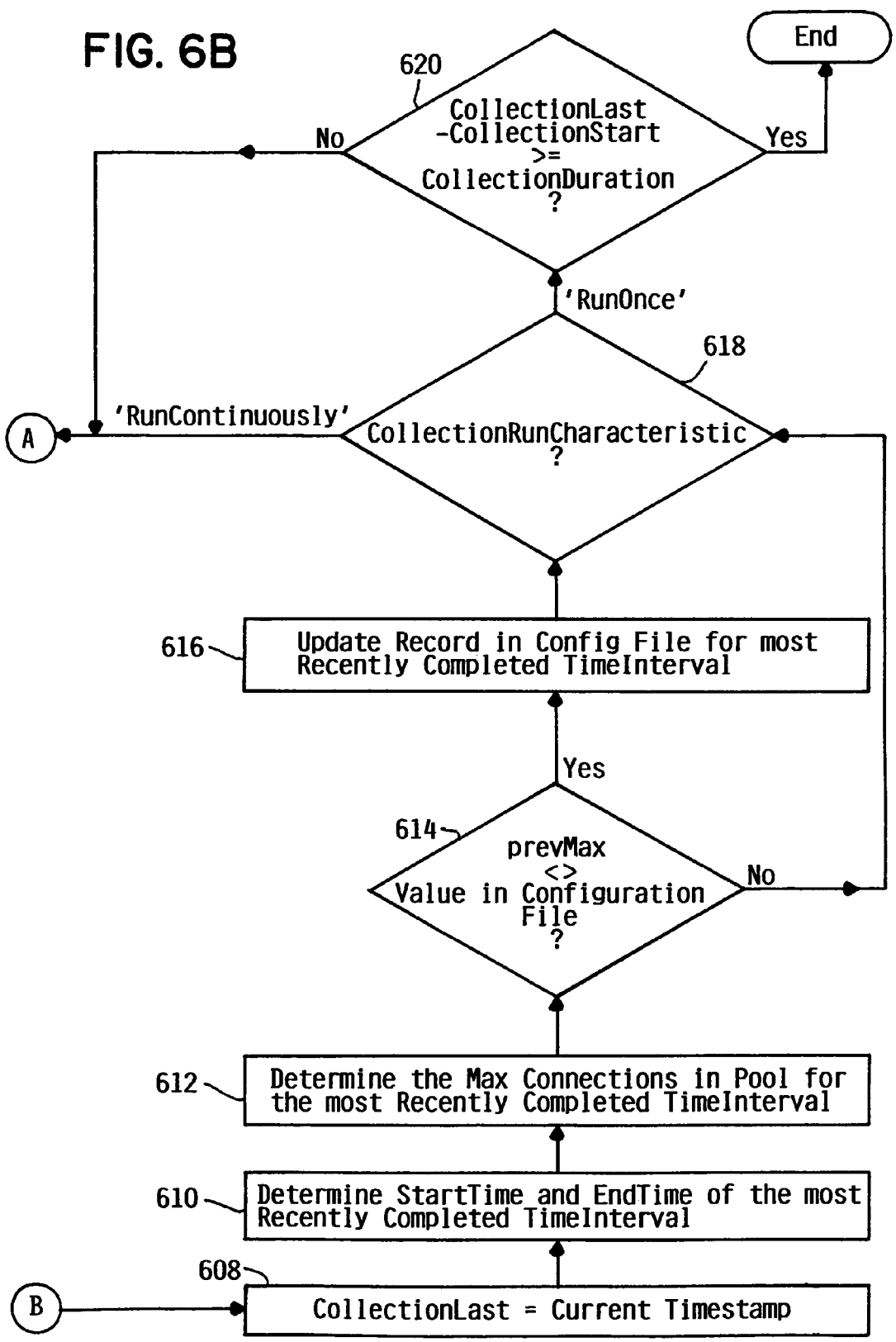

FIG. 6 illustrates one method of collecting autonomic configuration data. At block 601, the connection manager 180 sets a collectionStart variable equal to the current system time (i.e., the current timestamp). At blocks 602-604, the connection manager 180 parses the configuration file 130 to determine the collection interval property 432 for this data source and sets a collection timer equal to zero. At block 606, the connection manager 180 determines if the collection timer is less than the collection interval. If false, the connection manager 180 returns to block 605 to collect additional autonomic configuration data 605; otherwise the connection manager proceeds to block 608.

At block 608, the connection manager 180 obtains the current system time and date (i.e., the timestamp). At block 610, the connection manager 180 uses the current timestamp to determine the BeginTime 422 and the EndTime 424 (see FIG. 4) of the most recently completed time interval. At block 612, the connection manager 180 analyzes the autonomic configuration data to determine the maximum number of connections for the most recently completed time interval (e.g., using an application programming interface, such as prevMax=maxConnctionsInPool (startTime, endTime), that performs a statistical analysis on the autonomic configuration data). At block 614, the connection manager 180 determines whether the maximum connections calculated at block 612 is greater than or less than the corresponding values 420n stored in the configuration file 130. If no changes are required, the connection manager 180 proceeds to block 618, otherwise the connection manager 180 updates (at block 616) the record 420n in the configuration file 130 for the most recently completed time interval (e.g., MaxConnections=prevMax).

At bock 618, the connection manager 180 parses the configuration file 130 to determine this datasource's collection run characteristic 436 (see FIG. 4). If the collection run characteristic 436 is set to 'runOnce,' the connection manager 180 stops collecting the autonomic configuration data and runs in 'static' mode; however, if the collection run characteristic 436 is set to 'runContinuously,' the connection manager 180 returns to block 604.

Referring again to FIG. 1, the computer systems 102 in this embodiment are general-purpose programmable computing devices. Accordingly, the central processing units 110 may be any device capable of executing the program instructions stored in main memory 112, and may be constructed from one or more microprocessors and/or integrated circuits. In this embodiment, when one of the computer systems 102 start up, the associated CPU 110 initially executes the program instructions that make up the operating system 124, which manages the physical and logical resources of the computer system 102. These resources include the central processing unit 110, the main memory 112, the mass storage interface 114, the display interface 116, the network interface 118, and the system bus 122. In addition, although each computer system 102 in FIG. 1 is shown to with only a single processing unit 110 and a single system bus 122, those skilled in the art will appreciate that the present invention may be practiced using a computer system 102 that has multiple processing units 110 and/or multiple system buses 122. Moreover, the interfaces 114, 116, 118, and 120 may each include their own separate, fully programmed microprocessors and may be used to off-load compute-intensive processing from the main processing units 110.

The main memory 112 and the storage devices 140, 142 may be any system capable of storing and retrieving data for the central processing units 110. These systems may utilize virtual addressing mechanisms that allow the computer systems 102 to behave as if they only have access to a large, single storage entity instead of access to multiple, smaller storage entities such as the main memory 112 and the DASD device 140. Therefore, while the operating systems 124, the application servers 128, and the databases 126 are shown to reside in main memory 112, those skilled in the art will recognize that these items are not necessarily all completely contained in main memory 112 at the same time, and may even reside in the virtual memory of other computer systems coupled to the computer system 102.

The display interface 116 is used to directly connect one or more display units 180 to the computer system 102. These display units 180 may be non-intelligent (i.e., dumb) terminals, such as a cathode ray tube, or may themselves be fully programmable workstations used to allow IT administrators and users to communicate with one or more of the computer systems 102. Note, however, that while the display interface 116 is provided to support communication with one or more displays 180, the computer systems 102 does not necessarily require a display 180 because all needed interaction with users and other processes may occur via network interface 118.

The communication medium 106 can be any device or system that allows the computer systems 102 to communicate with each other. The network interfaces 118, accordingly, can be any device that facilitates such communication, regardless of whether the network connection is made using present-day analog and/or digital techniques or via some networking mechanism of the future. Suitable communication mediums 106 include, but are not limited to, the Internet, intranets, cellular transmission networks, wireless networks using one of the IEEE 802.1X specifications, and the like. Those skilled in the art will appreciate that many different network protocols can be used to implement the communication medium 106. The Transmission Control Protocol/Internet Protocol ("TCP/IP") is an example of a suitable network protocol for Internet-based communication.

The embodiment described with reference to FIGS. 1-4 generally uses a client-server network architecture. These embodiments are desirable because the clients 102b can utilize the services of the web server computers 102a without either computer system 102 requiring knowledge of the working details about the other. However, those skilled in the art will appreciate that other network architectures are within the scope of the present invention. Examples of other suitable network architectures include peer-to-peer architectures, grid architectures, and multi-tier architectures. Accordingly, the terms web server and client computer should not be construed to limit the invention to client-server network architectures.

One suitable web server computer 102a is an eServer iSeries computer running the i5/OS multitasking operating system, both of which are produced by International Business Machines Corporation of Armonk, N.Y. One client computer 102b is an IBM ThinkPad running the Linux or Windows operating systems, also available from International Business Machines Corporation. However, those skilled in the art will appreciate that the mechanisms and apparatus of the present invention apply equally to any computer system 102 and operating system 124, regardless of whether one or both of the computer 102 are complicated multi-user computing apparatuses, a single workstations, lap-top computers, mobile telephones, personal digital assistants ("PDAs"), video game systems, or the like.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client's operations, creating recommendations responsive to the analysis, generating software to implement portions of the recommendations, integrating the software into existing processes and infrastructure, metering use of the systems, allocating expenses to users of the systems, and billing for use of the systems.

Those skilled in the art will appreciate that the present invention and its autonomic configuration manager may be particularly desirable for Java connections because version 3.0 of the JDBC Specification does not account for changes in connection load over time. However, the present invention can be applied to other architectures that use connection pooling in a manner that is similar to JDBC connection pooling. For example, the J2EE Connector Architecture ("J2C") architecture provides a connection pooling mechanism that uses a common connector architecture for connection to various resources, e.g. Java Message Service ("JMS") connections, connections to legacy applications such as CICS, PeopleSoft, etc.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature.

Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

We claim:

1. An autonomic connection pool management method, comprising:
    initializing a connection pool in accordance with a plurality of initial configuration settings;
    automatically collecting autonomic configuration information, the autonomic configuration information comprising pool connection usage data for specified time intervals;
    automatically generating autonomic override information from the usage data; and
    automatically modifying the configuration settings using the autonomic override information.

2. The method of claim 1, wherein the plurality of initial settings comprises a collection management mode.

3. The method of claim 1, wherein the plurality of initial settings comprises a collection interval.

4. The method of claim 3, wherein the plurality of initial settings comprises a collection duration.

5. The method of claim 1, wherein the plurality of initial settings comprises a collection run characteristic.

6. The method of claim 1, wherein the pool connection usage data comprises a maximum number of connection during the specified time intervals.

7. The method of claim 1, further comprising:
    automatically collecting additional usage data;
    automatically generating additional autonomic override information from the additional usage data; and
    automatically further modifying the connection pool using the additional autonomic override information.

8. The method of claim 1, further comprising automatically modifying the connection pool using the configuration override information, comprising:
    receiving a timer event;
    in response to the timer event:
        determining a current time;
        determining a current number of connections; and
        if the current number of connections greater than a specified maximum associated with the current time:
            adding at least one new connections to the connection pool; and
            initializing timeout values for all available connections in the connection pool.

9. The method of claim 1, further comprising automatically modifying the connection pool using the configuration override information, comprising:
    receiving a connection timer event;
    in response to the connection timer event:
        determining a current time;
        determining a current number of connections;
        if a current number of connections is greater than a specified maximum associated with the current time:
            detecting one or more timed-out idle connection;
            destroying the one or more timed-out idle connections; and
        if a current number of connections is below a specified minimum associated with the current time:
            resetting time-out values for all of the connections in the pool.

10. The method of claim 1, further comprising automatically modifying the connection pool using the configuration override information, comprising:
    receiving a connection event;
    in response to receiving a request to connect:
        detecting a current number of connections;
        determining a current time of day; and
        if the current number of connections is less than the modified maximum number of connections for the time period associated with the current time of day, creating a new connection.

11. The method of claim 1, wherein automatically collecting autonomic configuration information comprises:
    determining a maximum number of connections during a measurement interval;
    comparing the measured maximum number of connections to corresponding configuration settings.

12. The method of claim 1, further comprising:
    in response to initializing the connection pool, operating the connection pool in accordance with the plurality of initial configuration settings; and
    in response to automatically modifying the connection settings, operating connection pool in accordance with the modified configuration settings.

13. A computer-implemented method of managing a connection pool, comprising:
    initializing a connection pool with a set of initial settings, wherein the set of initial settings include a collection interval and a collection duration;
    automatically collecting autonomic configuration data for the collection duration, the autonomic configuration data including a maximum number of connections observed during the collection interval;
    automatically determining an set of optimal settings using the autonomic configuration data; and
    automatically modifying the configuration settings to the set of optimal settings.

14. The method of claim 13, further comprising:
    automatically collecting additional autonomic configuration data for a second collection duration, the additional autonomic configuration data including a maximum number of connections observed during the second collection interval;
    automatically adjusting the set of optimal settings using the additional autonomic configuration data; and
    automatically modifying the connection pool according to the adjusted set of optimal settings.

15. The method of claim 14, wherein the connection pool comprises Java Database Connectivity connections.

16. The method of claim 14, wherein the connection pool comprises Java 2 Connector connections.

17. A method of deploying computing infrastructure, comprising:
    integrating computer readable code into a computing system, wherein the code in combination with the computing system is capable of performing a method of autonomically managing a connection pool comprising:
        initializing a connection pool in accordance with a plurality of initial configuration settings;
        automatically collecting autonomic configuration information, the autonomic configuration information comprising pool connection usage data for specified time intervals;
        automatically generating autonomic override information from the usage data; and automatically modifying the configuration settings using the autonomic override information.

18. The method of claim 17, further comprising:

analyzing the computing system;

creating recommendations responsive to the analysis; and generating computer readable code to implement portions of the recommendations.

* * * * *